United States Patent
Santra et al.

(10) Patent No.: US 11,057,265 B2
(45) Date of Patent: Jul. 6, 2021

(54) PATH CHECK INSIGHT

(71) Applicant: CERNER INNOVATION, INC., Kansas City, KS (US)

(72) Inventors: Pravat Santra, Bangalore (IN); D. Sasidhar Reddy, Bangalore (IN); Dinesh Naidu, Bangalore (IN); Harsha Srihari, Mysore (IN); Latha M, Bangalore (IN); Vignesh Lakshmanan, Bangalore (IN); Subhojit Bhowmick, Bangalore (IN); Pankaj Mishra, Bengaluru (IN); Arumugabarathi Selvaraj, Kandanchavadi (IN); Arindam Lahiri, Kolkata (IN); Sudhanshu Kumar, Bangalore (IN)

(73) Assignee: CERNER INNOVATION, INC., Kansas City, KS (US)

(*) Notice: Subject to any disclaimer, the term of this patent is extended or adjusted under 35 U.S.C. 154(b) by 30 days.

(21) Appl. No.: 16/454,767

(22) Filed: Jun. 27, 2019

(65) Prior Publication Data

US 2020/0412642 A1 Dec. 31, 2020

(51) Int. Cl.
*H04L 12/24* (2006.01)
*H04L 12/26* (2006.01)

(52) U.S. Cl.
CPC ...... *H04L 41/0677* (2013.01); *H04L 41/0631* (2013.01); *H04L 41/0853* (2013.01); *H04L 41/12* (2013.01); *H04L 43/06* (2013.01); *H04L 43/0823* (2013.01)

(58) Field of Classification Search
CPC . H04L 41/06; H04L 41/0631; H04L 41/0677; H04L 41/0853; H04L 41/12; H04L 43/06; H04L 43/0823
See application file for complete search history.

(56) References Cited

U.S. PATENT DOCUMENTS

| | | | | |
|---|---|---|---|---|
| 5,581,543 A | * | 12/1996 | Natarajan | H04B 1/745 340/2.7 |
| 2007/0106768 A1 | * | 5/2007 | Frietsch | H04L 41/20 709/223 |
| 2008/0263386 A1 | * | 10/2008 | Darrington | G06F 11/203 714/4.11 |

* cited by examiner

*Primary Examiner* — Kevin C. Harper
(74) *Attorney, Agent, or Firm* — Shook, Hardy & Bacon L.L.P.

(57) ABSTRACT

Embodiments of the present disclosure relate to systems, methods, and user interfaces for monitoring and maintaining redundant network and storage paths. Initially, path check information is received at a path check server via one or more management nodes. Each of the one or more management nodes comprises one or more physical nodes corresponding to network and hardware infrastructure. Failed nodes of the one or more physical nodes are identified, the failed nodes indicating physical nodes having path failures. Upon determining the node does not have an active incident in progress, an incident corresponding to the node is generated. In embodiments, a notification may be communicated to one or more team members. The notification may include the incident and a status of the incident. In embodiments, data visualization corresponding to the incident may be provided.

18 Claims, 6 Drawing Sheets

510 — Weekly Incidents Report

520 — Weekly Progress

530 — Regional Count

| Region | Network | | | | Storage | | | |
|---|---|---|---|---|---|---|---|---|
| | Open | Closed | | | Open | Closed | | |
| | | Weekly | Monthly | Quarterly | | Weekly | Monthly | Quarterly |
| Central | 0 | 0 | 1 | 5 | 5 | 0 | 8 | 53 |
| CSM | 0 | 0 | 0 | 0 | 1 | 0 | 0 | 0 |
| eHosting | 0 | 0 | 0 | 5 | 0 | 0 | 3 | 27 |
| ETS | 0 | 0 | 0 | 0 | 2 | 0 | 1 | 12 |
| Federal | 5 | 0 | 0 | 1 | 0 | 0 | 0 | 0 |
| MidWest | 0 | 0 | 0 | 6 | 0 | 0 | 9 | 36 |
| NorthAtlantic | 0 | 1 | 1 | 2 | 0 | 0 | 2 | 28 |
| SouthEast | 2 | 1 | 2 | 9 | 0 | 0 | 2 | 33 |
| West | 2 | 0 | 0 | 5 | 0 | 0 | 4 | 21 |
| Total | 9 | 2 | 4 | 33 | 8 | 0 | 29 | 210 |

540 — In Open Status

| Hostname | Type | Owner | Incident # | Instance | Region | Enclosure |
|---|---|---|---|---|---|---|
| UCQSAUDB3.CERNAU.COM | NET | Others | INC000013535593 | 1 | Global | IR-013-05 |
| CERNIOSSFABRIC113 | NET | Others | INC000019324544 | 1 | | KC1-TT-04-12 |
| CDCCAAPP3 | NET | Chris Thompson | INC000019529967 | 2 | Federal | KC1-GG-13-12 |
| VHADCAPP1 | NET | Others | INC000019846674 | 1 | Federal | KC2-U-23-32 |
| VHADCAPP2 | NET | Others | INC000019846817 | 1 | Federal | KC2-U-23-22 |
| VHADCDB1 | NET | Others | INC000019846675 | 1 | Federal | KC2-U-23-32 |
| VHADCDB2 | NET | Others | INC000019846676 | 1 | Federal | KC2-U-23-22 |
| LOMACAM1 | NET | Unassigned | INC000020088954 | 1 | West | LS3-BB-16-32 |
| CHWBCAMDBUS02 | NET | Unassigned | INC000020104326 | 1 | West | UNKNOWN |
| MCGHGAPSFTDB10 | NET | Edward Hernandez | INC000020104327 | 1 | SouthEast | KC3-TT-32-32 |
| AHSFLDB31 | NET | Edward Hernandez | INC000020131232 | 2 | SouthEast | RACK--KC2GG32NW |
| CESREMDBTST00 | SAN | Unassigned | INC000018699770 | 1 | CSM | KC1-TT-05-22 |
| CESEMMIDPRD111 | SAN | Scott Stewart | INC000019366980 | 1 | ETS | KC1-TT-06-32 |
| CESEMMIDPRD112 | SAN | Scott Stewart | INC000019367612 | 1 | ETS | KC1-TT-07-32 |
| BVHAOHDB3 | SAN | David Young | INC000019428154 | 3 | Central | LS6-MM-32-22 |
| AHAUTXDB4.DR.AHAU_TX | SAN | Jesse Washington | INC000019528863 | 3 | Central | KC1-M-23-22 |
| DTRTMIAPP1.DR.DTRT_MI | SAN | Jesse Washington | INC000019548413 | 1 | Central | RACK-KC1X35NW |
| DUBOPAAPP4 | SAN | Jesse Washington | INC000019846672 | 1 | Central | KC2-M-22-22 |
| AHDEMIDB3 | SAN | Unassigned | INC000020150883 | 3 | Central | KC1-M-22-32 |

550 — Closed in last 7 days

| Hostname | Type | Owner | Incident # | Instance | Region | Enclosure |
|---|---|---|---|---|---|---|
| NORWCTAPP2 | NET | Roy Harris | INC000019399545 | 1 | NorthAtlantic | KC2-M-22-32 |

PATH CHECK INSIGHT

BACKGROUND

Nearly all technology-based businesses suffer due to hardware failure related downtime. The core of most applications run on physical servers which are dependent on network and storage to provide uninterrupted services to them. However, this is not always possible in real world scenarios. To eliminate single points of failure, these services are typically deployed on redundant systems. Redundancy plays a key factor in guaranteeing stakeholder satisfaction and maintaining operational excellence. For example, a group of servers supporting the business can be deployed with redundant network and storage paths. Monitoring and maintaining these paths on a regular basis is a key to downtime free environment.

If a node fails (e.g., a network interface controller (a NIC), a host bus adapter (HBA), interfaces, ports, and the like), a single point of failure results. To ensure the nodes do not remain on a single point of failure, conventional systems utilize scripts to collect information from the servers. Not only do these scripts require a significant amount of time and processing to collect the necessary information from the servers, the resulting data must be analyzed, verified, and filtered before an incident can be created for each failed path. In most infrastructure settings, this requires many hours of manual effort on a weekly basis, and even after incidents are created, human error may result in missed failed paths or false positive failed paths.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure relate to systems, methods, and user interfaces for monitoring and maintaining redundant network and storage paths. More particularly, embodiments of the present disclosure provides automated monitoring for paths of physical nodes, automated incident creation, and automated reporting and data visualization. To do so, path check information is initially received at a path check server via one or more management nodes. Each of the one or more management nodes comprises one or more physical nodes corresponding to network and hardware infrastructure. Failed nodes of the one or more physical nodes are identified, the failed nodes indicating physical nodes having path failures. Upon determining the node does not have an active incident in progress, an incident corresponding to the node is generated. In embodiments, a notification may be communicated to one or more team members. The notification may include the incident and a status of the incident. In embodiments, data visualization corresponding to the incident may be provided.

BRIEF DESCRIPTION OF THE SEVERAL VIEWS OF THE DRAWINGS

The patent or application file contains at least one drawing executed in color. The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

As noted in the background, nearly all technology-based businesses suffer due to hardware failure related downtime. The core of most applications run on physical servers which are dependent on network and storage to provide uninterrupted services to them. However, this is not always possible in real world scenarios. To eliminate single points of failure, these services are typically deployed on redundant systems. Redundancy plays a key factor in guaranteeing stakeholder satisfaction and maintaining operational excellence. For example, a group of servers supporting the business can be deployed with redundant network and storage paths. Monitoring and maintaining these paths on a regular basis is a key to downtime free environment.

If a node fails (e.g., a network interface controller (a NIC), a host bus adapter (HBA), interfaces, ports, and the like), a single point of failure results. For example, a physical server may have multiple NICs that are connected to one or more switches on the network side. Internet Protocol (IP) addresses may be configured for the server over these aggregate interfaces. A network path might fail due to multiple reasons (e.g., a faulty NIC, virtual local area network (VLAN) or speed settings on the switch, cabling issues, operating system (OS) driver issues, interface attributes, and the like). Each physical node might have two or more HBAs that enable multipathing to a storage area network (SAN). A SAN path might fail due to multiple reasons (e.g., SAN-side zoning problems, faulty HBAs, multipath not registered at the server, issues with scanning the path on the server, OS issues, small computer system interface (SCSI) timeouts, and the like).

To ensure the nodes do not remain on a single point of failure, conventional systems utilize scripts to collect information from the servers. Not only do these scripts require a significant amount of time and processing to collect the necessary information from the servers, the resulting data must be analyzed, verified, and filtered before an incident can be created for each failed path. In most infrastructure settings, this requires many hours of manual effort on a weekly basis, and even after incidents are created, human error may result in missed failed paths or false positive failed paths.

Embodiments of the present disclosure relate to systems, methods, and user interfaces for monitoring and maintaining redundant network and storage paths. More particularly, embodiments of the present disclosure provides automated monitoring for paths of physical nodes, automated incident creation, and automated reporting and data visualization. To do so, initially, path check information is received at a path check server via one or more management nodes. Each of the one or more management nodes comprises one or more physical nodes corresponding to network and hardware infrastructure. Failed nodes of the one or more physical nodes are identified, the failed nodes indicating physical nodes having path failures. Client-side nodes, disposed or reclaimed nodes, and out-of-scope nodes are excluded from the failed nodes. To determine a node of the failed nodes that does not have an active incident in progress, nodes corresponding to a list of path failure that have active incidents in progress are initially identified. Upon determining the node does not match the identified nodes, an incident corresponding to the node is generated. In embodiments, a notification may be communicated to one or more team members. The notification may include the incident and a status of the incident. In embodiments, data visualization corresponding to the incident may be provided. This automated process ensures that when there is a failure, the nodes do not remain on a single point of failure, and issues can be proactively and automatically solved.

Accordingly, one embodiment of the present disclosure is directed to one or more computer storage media having computer-executable instructions embodied thereon that, when executed by a computer, causes the computer to perform operations. The operations include receiving, at a path check server, path check information via one or more management nodes. Each of the one or more management nodes comprises one or more physical nodes corresponding to network and hardware infrastructure. The operations also include identifying failed nodes of the one or more physical nodes, the failed nodes indicating physical nodes with path failures. The operations further include excluding client-site nodes, disposed or reclaimed nodes, and out-of-scope nodes from the failed nodes. The operations also include, upon determining a node of the failed nodes does not have an active incident in progress, generating an incident corresponding to the node.

In another embodiment, the present disclosure directed to a computerized method. The method comprises receiving, at a path check server, path check information via one or more management nodes. Each of the one or more management nodes comprises one or more physical nodes corresponding to network and hardware infrastructure. The method also comprises identifying failed nodes of the one or more physical nodes, the failed nodes indicating physical nodes with path failures. The method further comprises excluding client-site nodes, disposed or reclaimed nodes, and out-of-scope nodes from the failed nodes. The method also comprises determining a node of the failed nodes does not have an active incident in progress by: identifying nodes corresponding to a list of path failures that have active incidents in progress; and determining the node does not match the identified nodes. The method further comprises generating an incident corresponding to the node.

In yet another embodiment, the present disclosure is directed to a system. The system comprises a processor; and a computer storage medium storing computer-usable instructions that, when used by the processor, cause the processor to: receive, at a path check server, path check information via one or more management nodes, each of the one or more management nodes comprising one or more physical nodes corresponding to network and hardware infrastructure; identify failed nodes of the one or more physical nodes, the failed nodes indicating physical nodes with path failures; exclude client-site nodes, disposed or reclaimed nodes, and out-of-scope nodes from the failed nodes; add the failed nodes to the list of path failures; import the list of path failures into a path check database; determine a node of the failed nodes does not have an active incident in progress by: identifying nodes corresponding to a list of path failures that have active incidents in progress; and determining the node does not match the identified nodes; generate an incident corresponding to the node; and provide data visualization corresponding to the incident.

Figure 1:
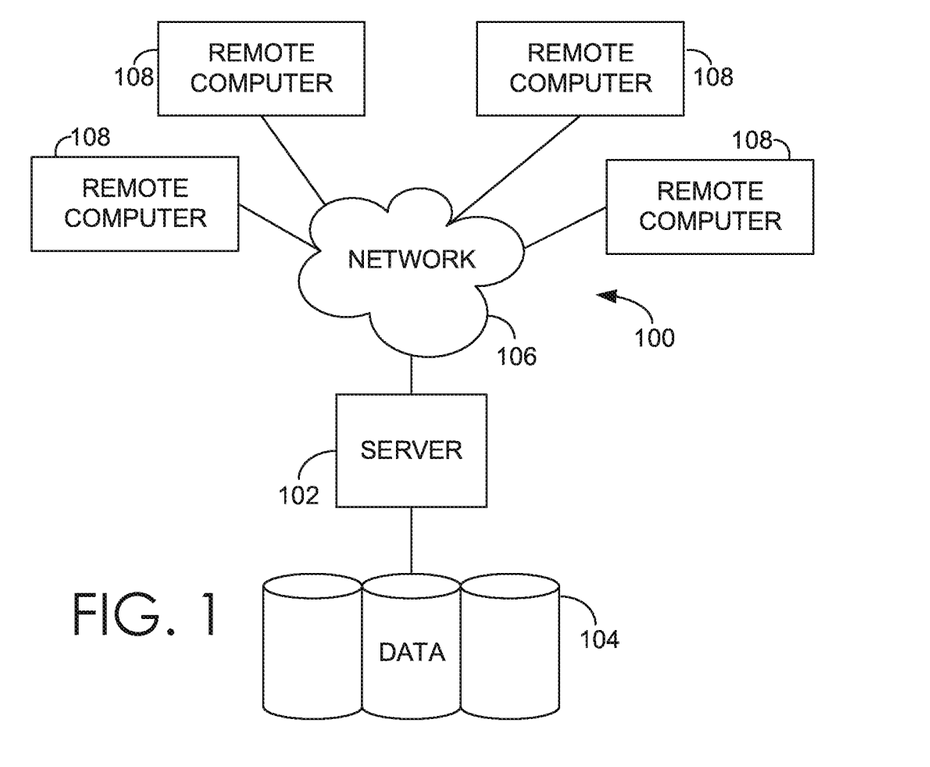
FIG. 1 is a block diagram of an exemplary operating environment suitable to implement embodiments of the present invention.

Having briefly described embodiments of the present invention, an exemplary operating environment suitable for use in implementing embodiments of the present invention is described below. FIG. 1 provides an aspect of an example operating environment with which embodiments of the present invention may be implemented. The aspect of an operating environment is illustrated and designated generally as reference numeral 100.

Example operating environment 100 comprises a general purpose computing device in the form of a control server 102. Exemplary components of the control server 102 comprise a processing unit, internal system memory, and a suitable system bus for coupling various system components, including database cluster 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Control server 102 typically includes therein, or has access to, a variety of computer-readable media, for instance, database cluster 104. Computer-readable media can be any available media that might be accessed by control server 102, and includes volatile and nonvolatile media, as well as, removable and nonremovable media. Computer-readable media might include computer storage media. Computer storage media includes volatile and nonvolatile media, as well as removable and nonremovable media implemented in any method or technology for storage of information, such as computer-readable instructions, data structures, program modules, or other data. In this regard, computer storage media might comprise RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 102. Computer storage media does not comprise signals per se. Combinations of any of the above also may be included within the scope of computer-readable media.

The computer storage media discussed above and illustrated in FIG. 1, including database cluster 104, provide storage of computer-readable instructions, data structures, program modules, and other data for the control server 102. In some embodiments, database cluster 104 takes the form of a cloud-based data store, and in some embodiments is accessible by a cloud-based computing platform.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home health care environments, and providers' offices. Providers may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like.

The remote computers 108 might also be physically located in nontraditional medical care environments so that the entire health care community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

Exemplary computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networked environment, program modules or portions thereof might be stored in association with the control server 102, the database cluster 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote health care device to the control server 102. In addition to a monitor, the control server 102 and/or remote computers 108 might comprise other peripheral output devices, such as speakers and a printer.

In some embodiments, control server 102 is a computing system or platform made up of one or more computing devices. Embodiments of control server 102 may be a distributed computing system, a centralized computing system, a single computer such as a desktop or laptop computer or a networked computing system. Thus, in some embodiments, control server 102 comprises a multi-agent computer system with software agents.

Figure 2:
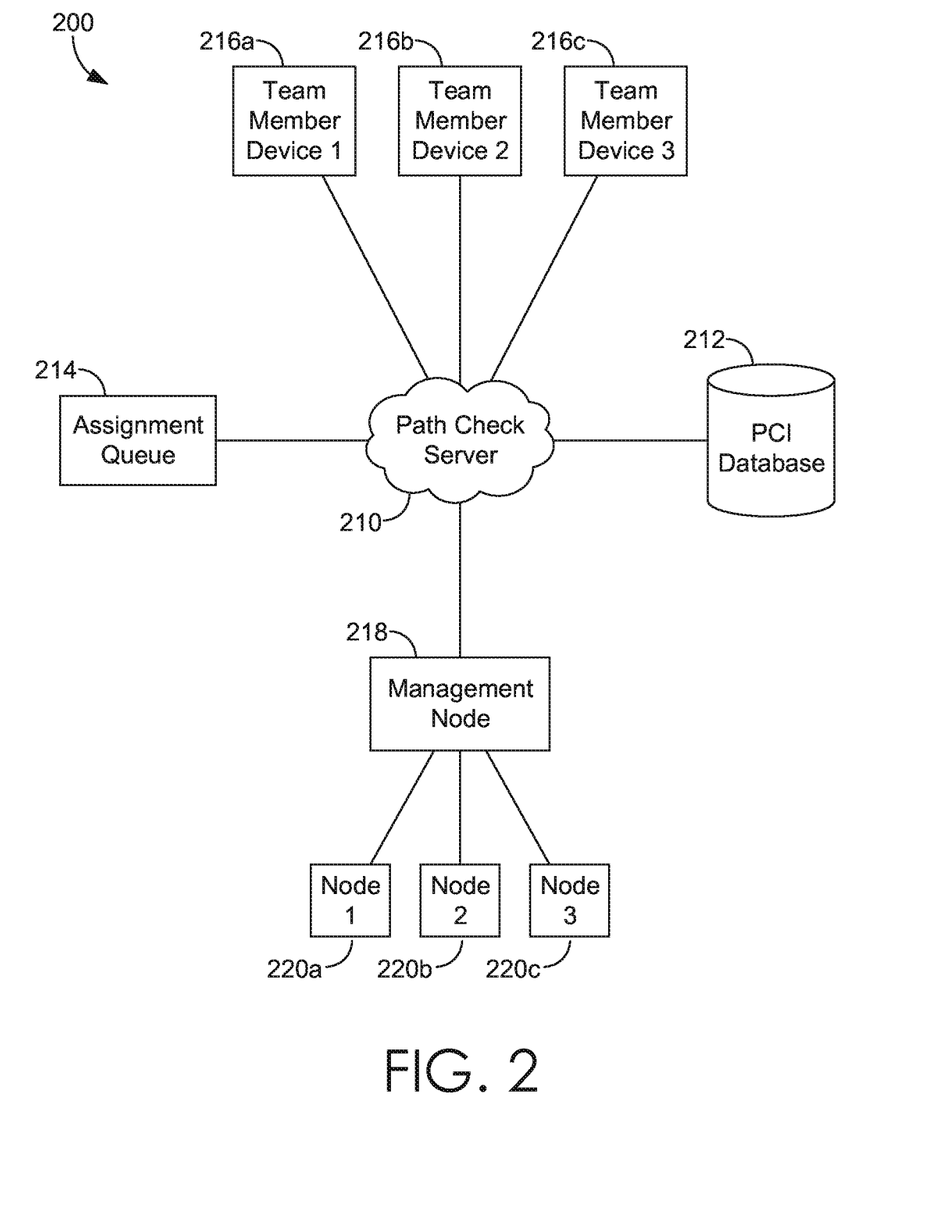
FIG. 2 depicts an exemplary framework of a path check system suitable to implement embodiments of the present invention.

Turning now to FIG. 2, an exemplary framework of a path check system 200 is shown, in accordance with an aspect of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The path check system 200 may be implemented via any type of computing device, such as computing device 100 described above with reference to FIG. 1, for example.

The path check system 200 generally operates to monitor and maintain redundant network and storage paths. More particularly, the path check system 200 provides automated monitoring for paths of physical nodes, automated incident creation, and automated reporting and data visualization. In doing so, the path check system 200 provides higher quality, consistency, and efficiency during the path check process. This automated process ensures that when there is a failure, the nodes do not remain on a single point of failure, and issues can be proactively and automatically solved.

As shown in FIG. 2, the path check system 200 includes, among other components not shown, path check server 210, path check insight (PCI) database 212, assignment queue 214, team member device(s) 216a, 216b, 216c, management node 218, node 1 220a, node 2 220b, and node 3 220c. It should be understood that the path check system 200 shown in FIG. 2 is an example of one suitable computing system architecture. Each of the components shown in FIG. 2 may be implemented via any type of computing device, such as computing device 100 described with reference to FIG. 1, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of path check servers, management nodes, nodes, PCI databases, assignment queues, and team member devices may be employed within the path check system 200 within the scope of the present disclosure. Each may comprise a single device or multiple devices cooperating in a distributed environment. For instance, the path check server 210 and/or the PCI database 212 may be provided via multiple devices arranged in a distributed environment that collectively provide the functionality described herein. In other embodiments, a single device may provide the functionality of multiple components of the path check system 200. For example, a single device may provide the path check server 210 and/or the PCI database. In some embodiments, some or all functionality provided by the path check server 210 and/or the PCI database 212 may be provided by a user device (e.g., team member device 1 216a). Additionally, other components not shown may also be included within the network environment.

Generally, the path check server 210 identifies failed nodes and generates incidents corresponding to the failed nodes. The path check server 210 provides higher quality, consistency, and efficiency during the path check process. In embodiments, a user may access and utilize the features of the path check server 210 via a portal provided by the path check server 210 and accessible by a team member device.

Initially, the path check server 210 receives path check information via one or more management nodes 218. Each of the one or more management nodes 218 comprises one or more physical nodes 220a, 220b, 220c corresponding to network and hardware infrastructure. Using the path check information, the path check server 210 identifies failed nodes of the one or more physical nodes 220a, 220b, 220c. For clarity, the failed nodes indicate physical nodes that have path failures (e.g., a failed NIC, a failed HBA, a failed interface, a failed port, and the like). The path check server 210 may additionally identify a location (i.e., network) and/or region corresponding to the failed nodes.

In implementation, path check server 210 initially fetches faulty paths for physical nodes 220a, 220b, 220c. Exemplary pseudo code to do so is illustrated in Table 1.

TABLE 1

```
//create CSV file for network related issues
if hostlist exists
   then verify if the nodes are phyiscal boxes
   if phyiscal node
      then fetch the failed interfaces details of the nodes
      if failed_interfaces >0
         then append the Network_CSV file with this node name and failed path details
//fetch required details and udpate the network csv file
for each nodes in the Network_CSV file
do
   get total_bond, active_interfaces and faulty_interfaces
   get location details of the node
   get model information
   update the Network_CSV file with above details for the same node
done
//create CSV file for storage related issues
if hostlist exists
   then verify if the nodes are phyiscal boxes
   if phyiscal node
      then fetch the failed paths details of the nodes
      if failed_path >0
         then append the Storage_CSV file with this node name and failed path details
//fetch required details and update the storage CSV file
for each nodes in the Storage_CSV file
do
   get total_path, active_path and faulty_path
   get location details of the node
   get model information
   update the Storage_CSV file with above details for the same node
done
copy the Network_CSV and Storage_CSV from management node to PCI instance.
```

In embodiments, client-side nodes, disposed or reclaimed nodes, and out-of-scope nodes are excluded by the path check server 210 from the failed nodes. The failed nodes are then added by the path check server 210 to a list of path failures. To determine a node of the failed nodes that does not have an active incident in progress, the path check server identifies nodes, stored in the PCI database 212, corresponding to a list of path failures that have active incidents in progress. Upon determining the node does not match the identified nodes, the path check server 210 generates an incident corresponding to the node. The incident may be imported in to the PCI database 212. In embodiments, a notification may be communicated by the path check server 210 to one or more team members via team member device(s) 216a, 216b, 216c. The notification may include the incident and a status of the incident. In embodiments, data visualization (e.g., a weekly incident report) corresponding to the incident may be provided. In embodiments, the incident may be communicated to an assignment queue 214 that may corresponding to the location and/or region of the failed node.

In implementation, path check server 210 creates the incident and updates the PCI database 212. Exemplary pseudo code to do so is illustrated in Table 2.

TABLE 2

```
//copy the CSV files as log_file to manipulate and manage the data. And maintain main CSV files as
backup
function log_file( ) {
   if Network_CSV
   then
      copy the contents of Network_CSV to network_log_file
   else if Storage_CSV
   then
      copy the contents of Storage_CSV to storage_log_file
   else
      exit
}
//exception list to avoid the incident generation for certain nodes
function apply_exception( ) {
   for lines in except_csv
   do
      verify if the node name exists in the Network_CSV and Storage_CSV failed_interfaces
      if found
      then
         discard the checks and incident generation for this particular node
      else
         proceed
}
```

TABLE 2-continued

```
//raise incidents using WSI API
function generate_incident( ) {
    raise an incident of path failure for the respective nodes using WSI
    update the lines with incident_id
    import_to_db( )
}
//to insert the record into the database
function import_to_db( ) {
    insert lines into database
}
//perform check to avoid duplication of incident generation
function check_previous_entries( ) {
    verify if the node has entry in database
    if exists
    then
        check status of the incident
        if status is assigned or inprogress
        then
            print incident already exist
            display status of incident
        else
            generate_incident()
}
//proceed to raise incidents with log_files (network and storage) having nodes with issues
for lines in network_log_file
do
    check_previous_entries( )
done
for lines in storage_log_file
do
    check_previous_entries( )
done
```

Figure 3:
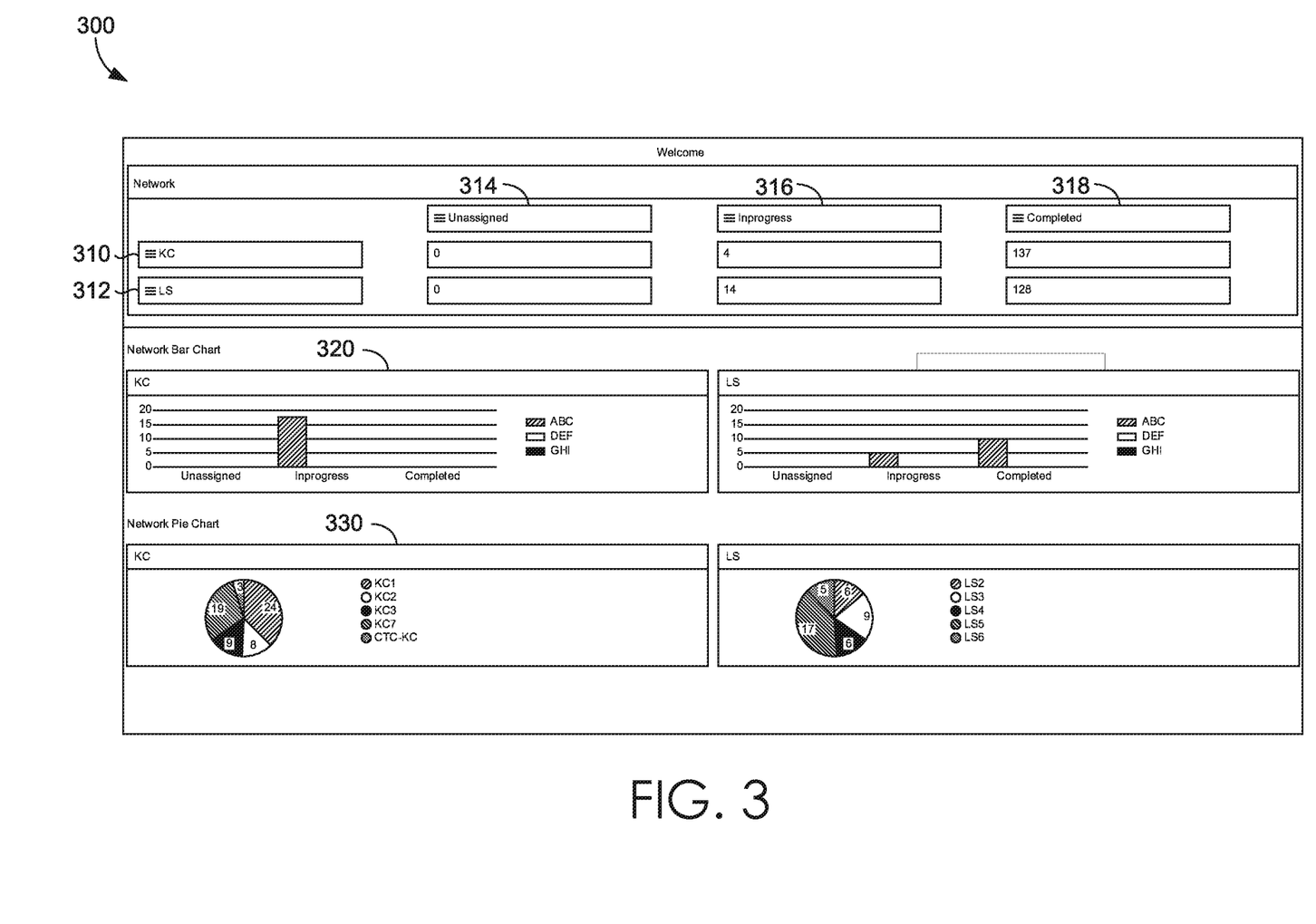
FIG. 3 depicts an illustrative screen display of a landing page for path check insight, in accordance with embodiments of the present invention.
Figure 4:
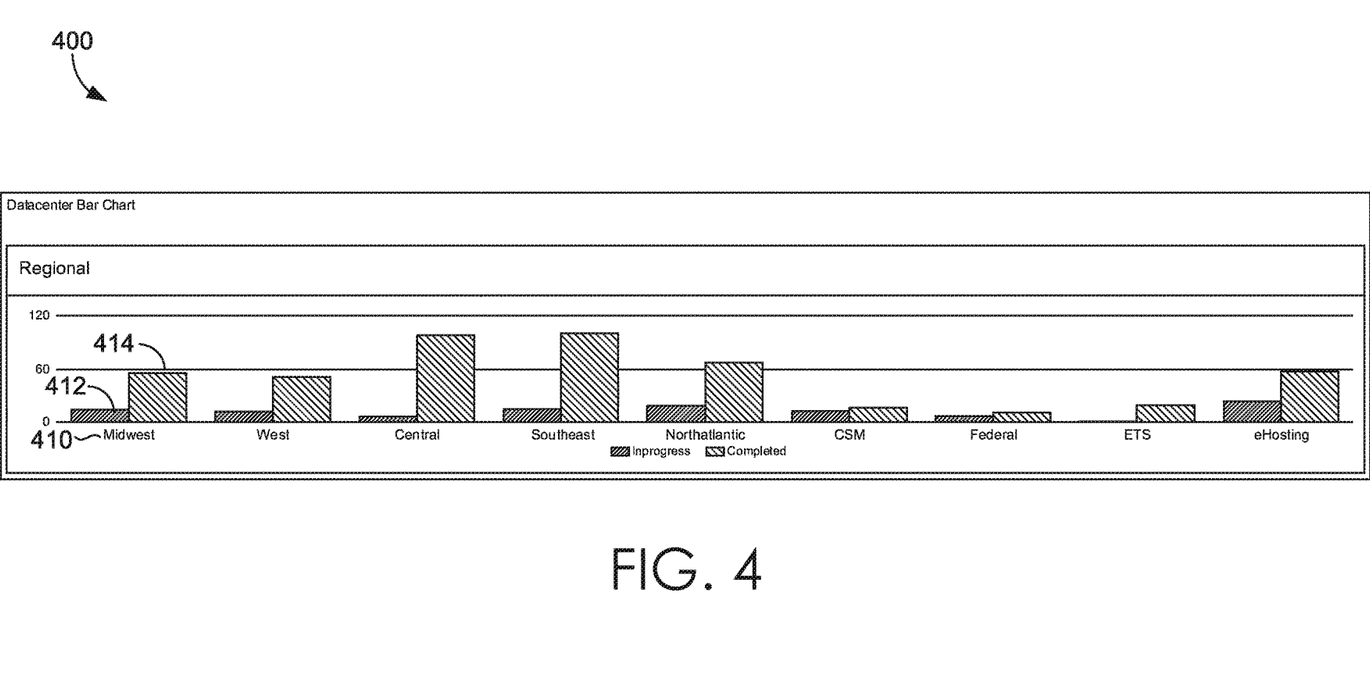
FIG. 4 depicts an illustrative screen display of regional queue progress for path check insight, in accordance with embodiments of the present invention.
Figure 5:
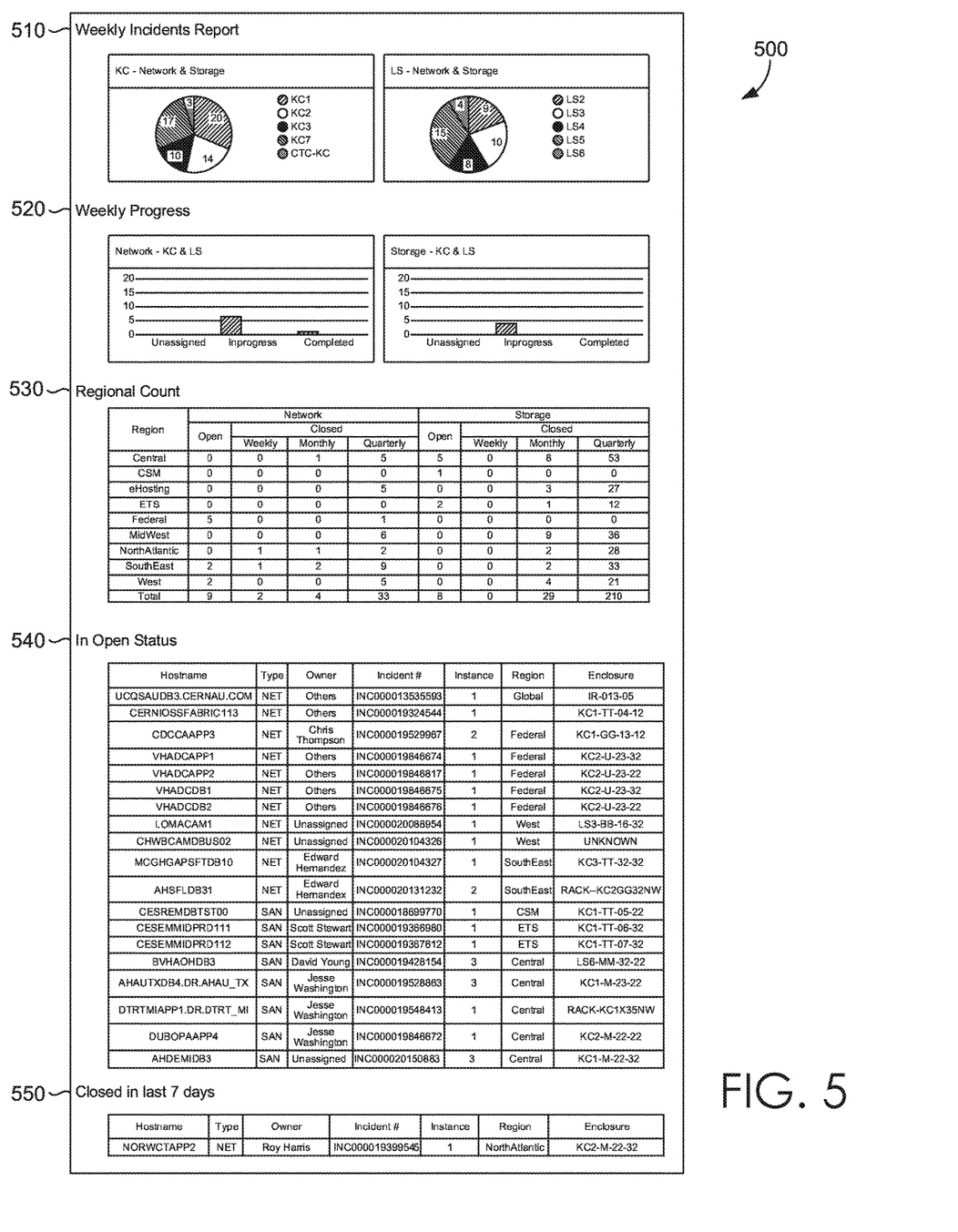
FIG. 5 depicts an illustrative screen display of a weekly incident report for path check insight, in accordance with embodiments of the present invention.

With reference to FIGS. 3-5, illustrative screen displays 300, 400, 500 of embodiments of the present invention are shown. It is understood that each of the illustrative screen displays are connected logically, such that they comprise a user interface designed for providing path check insight. The screen displays may appear in any order and with any number of screen displays, without regard to whether the screen display is described or depicted herein. The screen displays provide tools that enable higher quality, consistency, and efficiency during the path check process, in accordance with embodiments of the present invention.

Referring initially, to FIG. 3, an illustrative screen display of a landing page 300 for path check insight is depicted, in accordance with embodiments of the present invention. A count of unassigned incidents 314, in progress incidents 316, and completed incidents 318 are identified for each network 310, 312. Similar data may be illustrated in a network bar chart 320 or network pie chart 330 to provide better visualization of the overall redundancy health of the particular network. For example, the network bar chart 320 may illustrate in bar graph form the progress of the incidents. In another example, the network pie chart 330 may illustrate a count of incidents in a particular location corresponding to the network 310, 312.

Turning to FIG. 4, an illustrative screen display of regional queue progress 400 for path check insight is depicted, in accordance with embodiments of the present invention. As illustrated, a count of incidents corresponding to a regional queue for each geographic region 410 of a network is presented in a bar chart. For each geographic region 410, the count is provided for in progress incidents 412 and completed incidents 414.

In FIG. 5, an illustrative screen display of a weekly incident report 500 for path check insight is depicted, in accordance with embodiments of the present invention. The weekly incident report 500 may be displayed via the path check insight portal or may be automatically communicated to one or more team members, such as via electronic mail, short message service, and the like. The weekly incident report 500 may include visualized data of incidents in each geographic region for each network 510. The weekly incident report may additionally include weekly progress 520 of the incidents. A regional count table 530 may enable a team member to track the number of incidents existing in each regional queue with respect to weekly, monthly and quarterly timeframes. An in open status table 540 provides information corresponding to the incidents that are still in progress and a closed table 550 provides information corresponding to incidents closed recently (e.g., the last seven days).

Figure 6:
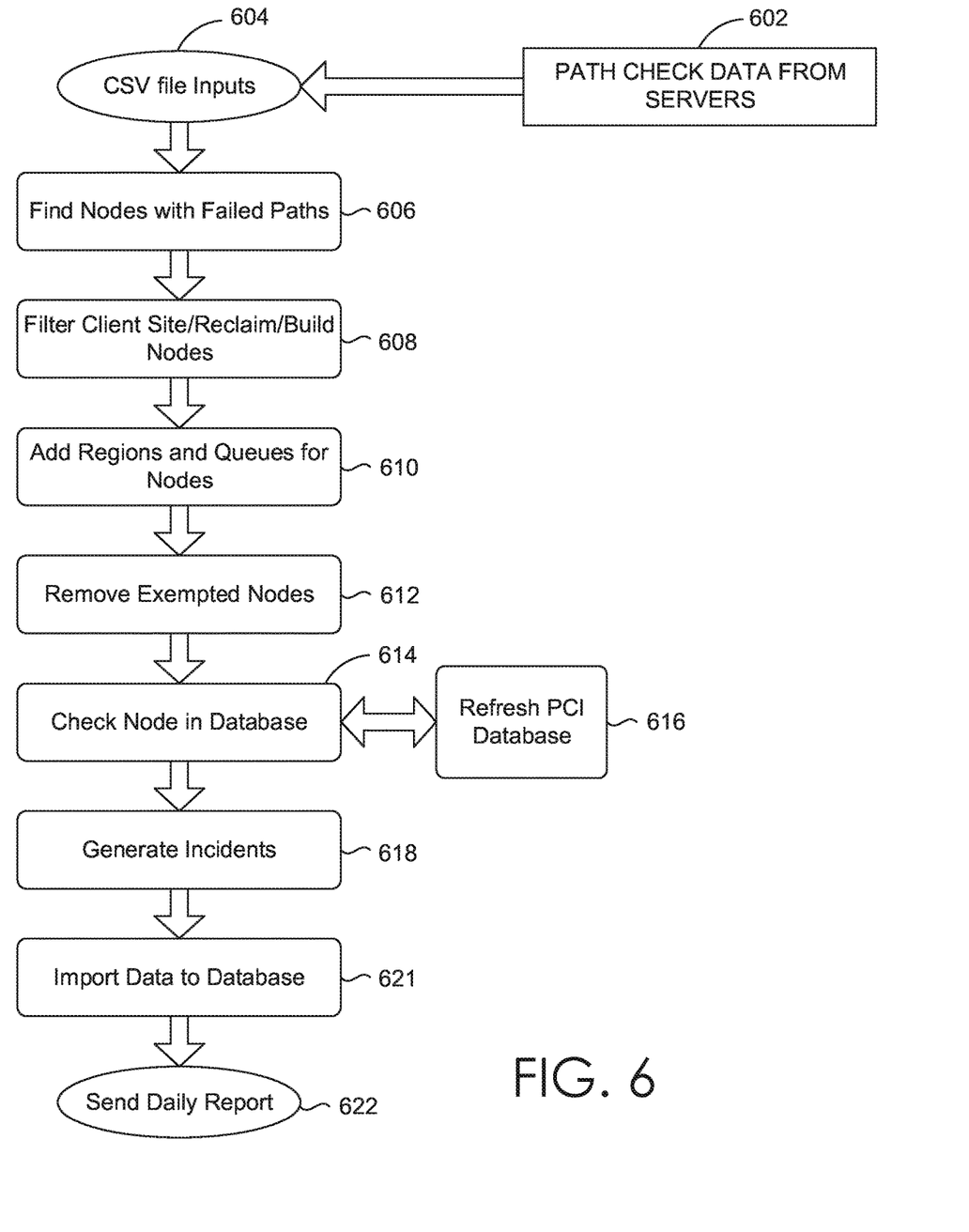
FIG. 6 depicts a flow diagram of path check insight, in accordance with an embodiment of the present invention.

Turning now to FIG. 6, a flow diagram is provided illustrating a method 600 for path check insight, in accordance with embodiments of the present invention. Method 600 may be performed by any computing device (such as computing device described with respect to FIG. 1) with access to an path check system (such as the one described with respect to FIG. 2) or by one or more components of the path check system.

Initially, at step 602, path check information is received at a path check server via one or more management nodes. The path check information may be received as or converted to a comma separated values (CSV) file, as shown at step 604. Each of the one or more management nodes comprise one or more physical nodes corresponding to network and hardware infrastructure.

At step 606, the path check server identifies failed nodes of the one or more physical nodes. The failed nodes indicate that a path failure exists for the identified nodes. The CSV file may be utilized by a path check insight script at the path check server to determine which nodes have path failures. Once path failures are identified, client-site nodes, disposed or reclaimed nodes, and out-of-scope nodes are excluded or filtered, at step 608 from a list of failed nodes. A management tool may be utilized to assist in this process. For example, if a particular failed node is not physically present within the control of the organization performing the path check, the node is no longer in use or has been reallocated, or is not meant to be part of the path check, it is excluded from the list of failed nodes. Regional assignment group information may additionally be appended to the list of failed nodes, as shown at step 610. Again, the management tool may be utilized to assist in this process.

Any nodes having specific exceptions may be removed from the list of failed nodes, at step 612. At step 614, it is determined whether a node of the failed nodes does not have an active incident in progress. A path check insight database may be refreshed, at step 616, prior to this determination. To determine whether a node of the failed nodes does not have an active incident in progress, nodes corresponding to the list of path failures that have active incidents in progress are identified. If the node does not match the identified nodes, then it is does not have an active incident in progress. If the node does not have an active incident in progress, a new incident is generated, at step 618, corresponding to the node. The incident may include a summary and detailed information and may be assigned to its corresponding regional queue.

At step 620, the incident is added to a final list of path failures and is imported into the path check database with a current timestamp. An email notification or daily report may also be communicated, at step 622, to team members with the generated incident and its status. Based on this information, the team members may work on incidents in their respective assignment queues and provide an optimal resolution. In some embodiments, data visualization corresponding to the incident may be provided. In this way, the entire process of identifying path failures is streamline through an automated process, reducing errors and many hours of manual labor.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. One or more computer storage media having computer-executable instructions embodied thereon that, when executed by a computer, causes the computer to perform operations, the operations comprising:
   receiving, at a path check server, path check information via one or more management nodes, each of the one or more management nodes comprising one or more physical nodes corresponding to network and hardware infrastructure;
   identifying failed nodes of the one or more physical nodes, the failed nodes indicating physical nodes with path failures;
   excluding client-site nodes, disposed or reclaimed nodes, and out-of-scope nodes from the failed nodes;
   upon determining a node of the failed nodes does not have an active incident in progress, generating an incident corresponding to the node;
   adding the incident to a list of path failures; and
   importing the list of path failures into a path check database.

2. The media of claim 1, wherein the determining the node of the failed nodes does not have an active incident in progress comprises:
   identifying nodes corresponding to the list of path failures that have active incidents in progress; and
   determining the node does not match the identified nodes.

3. The media of claim 1, further comprising communicating a notification to one or more team members, the notification including the incident and a status of the incident.

4. The media of claim 2, further comprising appending the information corresponding to the incident with regional assignment group information.

5. The media of claim 1, further comprising removing nodes from the failed nodes having specific exceptions.

6. The media of claim 1, wherein the incident includes a summary and detailed information.

7. The media of claim 4, further comprising assigning the incident to its corresponding regional queue.

8. The media of claim 1, further comprising providing data visualization corresponding to the incident.

9. A computerized method comprising:
   receiving, at a path check server, path check information via one or more management nodes, each of the one or more management nodes comprising one or more physical nodes corresponding to network and hardware infrastructure;
   identifying failed nodes of the one or more physical nodes, the failed nodes indicating physical nodes with path failures;
   excluding client-site nodes, disposed or reclaimed nodes, and out-of-scope nodes from the failed nodes;
   determining a node of the failed nodes does not have an active incident in progress by:
   identifying nodes corresponding to a list of path failures that have active incidents in progress; and
   determining the node does not match the identified nodes; and
   generating an incident corresponding to the node.

10. The method of claim 9, further comprising adding the incident to the list of path failures.

11. The method of claim, 10, further comprising importing the list of path failures into a path check database.

12. The method of claim 9, further comprising communicating a notification to one or more team members, the notification including the incident and a status of the incident.

13. The method of claim 10, further comprising appending the information corresponding to the incident with regional assignment group information.

14. The method of claim 9, further comprising removing nodes from the failed nodes having specific exceptions.

15. The method of claim 9, wherein the incident includes a summary and detailed information.

16. The method of claim 14, further comprising assigning the incident to its corresponding regional queue.

17. The media of claim 9, further comprising providing data visualization of the incident.

18. A system comprising:

a processor; and a computer storage medium storing computer-usable instructions that, when used by the processor, cause the processor to:

receive, at a path check server, path check information via one or more management nodes, each of the one or more management nodes comprising one or more physical nodes corresponding to network and hardware infrastructure;

identifying failed nodes of the one or more physical nodes, the failed nodes indicating physical nodes with path failures;

exclude client-site nodes, disposed or reclaimed nodes, and out-of-scope nodes from the failed nodes;

add the failed nodes to the list of path failures;

import the list of path failures into a path check database;

determine a node of the failed nodes does not have an active incident in progress by:

identifying nodes corresponding to a list of path failures that have active incidents in progress; and determining the node does not match the identified nodes;

generate an incident corresponding to the node; and provide data visualization corresponding to the incident.

* * * * *

UNITED STATES PATENT AND TRADEMARK OFFICE
CERTIFICATE OF CORRECTION

PATENT NO. : 11,057,265 B2  
APPLICATION NO. : 16/454767  
DATED : July 6, 2021  
INVENTOR(S) : Pravat Santra et al.

Page 1 of 1

It is certified that error appears in the above-identified patent and that said Letters Patent is hereby corrected as shown below:

In the Specification

Column 07, Line 08, Delete "udpate" and insert -- update --.

In the Claims

Column 12, Line 43, In Claim 9, before "identifying" insert -- (a) --.

Column 12, Line 45, In Claim 9, before "determining" insert -- (b) --.

Column 13, Line 20, In Claim 18, before "identifying" insert -- (a) --.

Column 13, Line 22, In Claim 18, before "determining" insert -- (b) --.

Column 12, Line 18, In Claim 4, delete "claim 2," and insert -- claim 1, --.

Column 12, Line 50, In Claim 11, delete "claim," and insert -- claim --.

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*